United States Patent
Boyland et al.

(10) Patent No.: US 7,317,269 B2
(45) Date of Patent: Jan. 8, 2008

(54) LOW VOLTAGE ELECTRONIC MOTOR WIRE TERMINATION

(75) Inventors: John Boyland, Christiansburg, VA (US); Dan McGuire, Radford, VA (US); Craig Harris, Dublin, VA (US); Ronald Kluever, Wake Forest, NC (US)

(73) Assignee: Kollmorgen Corporation, Simsbury, CT (US)

( * ) Notice: Subject to any disclaimer, the term of this patent is extended or adjusted under 35 U.S.C. 154(b) by 0 days.

(21) Appl. No.: 10/987,836

(22) Filed: Nov. 12, 2004

(65) Prior Publication Data
US 2005/0218732 A1    Oct. 6, 2005

Related U.S. Application Data

(60) Provisional application No. 60/519,968, filed on Nov. 13, 2003.

(51) Int. Cl.
*H02K 5/22* (2006.01)
*H01R 4/28* (2006.01)

(52) U.S. Cl. .................. 310/71; 439/722; 439/801

(58) Field of Classification Search .............. 310/71, 310/89; 439/877, 878, 801, 813, 722
See application file for complete search history.

(56) References Cited

U.S. PATENT DOCUMENTS

| 5,037,333 A | * | 8/1991 | Baubles ...................... 439/722 |
| 5,580,286 A | * | 12/1996 | Kramer et al. .............. 439/813 |
| 6,664,678 B2 | * | 12/2003 | Shimizu ....................... 310/71 |
| 2001/0017495 A1 | * | 8/2001 | Sato et al. ................ 310/67 R |

* cited by examiner

*Primary Examiner*—Tran Nguyen
(74) *Attorney, Agent, or Firm*—Morgan & Finnegan LLP

(57) ABSTRACT

The present invention provides a simple and robust design implementing an easily accessible external terminal connection point for supplying drive current to an AC motor. An embodiment of the invention is directed to an insertion plug and a conductor formed within the insertion plug. Specifically, the conductor acts as a current bus through an insertion aperture defined in a motor housing. The interior end of the conductor acts as an interior connection terminal for an AC phase coil, whereas the exterior end of the conductor is configured to accept an external motor drive source power cable. Advantageously, the modularity of the insertion plug design and a modified insertion housing aperture stamping program provide significant flexibility with regard to placement of the connection terminal. This aspect of the invention allows the connection terminals, as well as a corresponding motor housing to be customized for pre-existing mechanical designs and assemblies.

20 Claims, 7 Drawing Sheets

LOW VOLTAGE ELECTRONIC MOTOR WIRE TERMINATION

RELATED APPLICATION

The instant application hereby claims priority to the U.S. provisional patent application Ser. No. 60/519,968 titled, "Low Voltage Electronic Motor Wire Termination" filed on Nov. 13, 2003, which is incorporated by reference herein.

FIELD OF THE INVENTION

This invention relates generally to alternating current (AC) motors and, more particularly, to connection terminals used to provide drive current to a motor.

BACKGROUND OF THE INVENTION

In the past, electric forklifts, wheel chairs and golf carts have traditionally been powered by direct current (DC) motors. Typically, DC motors are longer than a similarly powered AC motor, because they require additional operational elements such as a brush commutator. The commutator provides a connection point between the current driving the motor and the moving parts of the motor. DC motor elements often require additional maintenance because of this connection of moving mechanical parts. For instance, brush and commutator wear require disassembly of the machine and replacement of these parts.

As in the diagram illustrated in FIG. 1, conventional electric DC motor 100 incorporates three-phase threaded terminal stud connections 105, which protrude through the non-drive end bell. These studs can be positioned at various angles to facilitate attachment of the drive cables. The M8 (8 mm) threaded termination studs 105 provide the primary external power connection point to the motor. Secondary DC electrical connections (e.g., brushes and commutator) are made internal to the motor 100. In the DC motor lead wire is used to electrically connect the brush assembly to the terminals. Lead wire consists of many fine strands of wire that are uninsulated from each other—there is only an outer jacket of insulation around all of the wires. Once this outer jacket is removed, the group of fine wires can be readily terminated to the terminal conductor thru brazing or other means.

In contrast, AC motors are mechanically simpler and have a shorter frame size because they lack the DC motor's commutators and brushes. AC motors typically have either permanent magnet or squirrel cage rotors and therefore only need to supply drive current to the stationary portion of the motor. In a conventional three phase AC motor design 200, shown in FIGS. 2A and 2B, lead wires 205 (lengths of wire connected to the individual AC phase coils) exit the center of the motor 200 at point 225 and are terminated at the center of the motor body. Each phase has a terminal mounted to an M8 threaded stud 210 molded to a Rynite terminal block 215. Simple corrugated tubing 220 is then used to cover each external phase 205 from the exit point 225 on the non-drive end bell to the terminal block 215.

There are several design and safety concerns with the conventional AC wire terminals illustrated in FIGS. 2A and 2B. As illustrated, lead wires 205 are covered in simple corrugated tubing 220 and exposed to the motor's external operating environment. The wires are not substantially insulated. People working around the motor are therefore exposed to a significant risk of electric shock. Moreover, in day-to-day operation this type of motor design is often mishandled by users that attempt to lift the motor by wires 205. The wires 205 are not designed to support the weight of the AC motor 200. This type of misuse increases the risk of live electric wires becoming unfastened from their terminals 210 and further increases the risk of electric shock. Also, the AC lead wires are bundles of magnet wires that exit the phase coils at 335U, 335V, and 335W (shown in FIG. 3E) respectively, each of the individual wires comprising the bundle have a minor layer of insulation on their exterior. The existence of the layer of insulation means that the bundle of wires cannot be readily terminated to the terminal conductor. This is due to the high temperatures required to vaporize off the layer of insulation which eliminates brazing and the contaminating effect of the vaporized insulation layer to the resulting bundle strength which makes electrical resistance fusing or welding a problem. Removal of the insulation layer on each individual wire is possible but time consuming.

One conventional solution involves a two step process: (1) placing a ring of conductive material, such as a conductive ferrule, around the bundle of magnet wire with the insulation still in place and electric resistance fusing the wire bundle and the ferrule together; and (2) connecting the ferrule to the terminal conductor by brazing, soldering or other means to provide an electrical connection.

Also, as illustrated in FIG. 2A, the power connection location is fixed at the center of the conventional AC motor. Typically, end users prefer power connection points that can be positioned at various angles around the exterior of the motor to accommodate varied cable lengths similar to the DC motor design.

SUMMARY OF THE INVENTION

Accordingly, the present invention provides a simple and robust design that resolves both the operational design and safety issues discussed above. An embodiment of the invention is directed to an insulating plug and a conductor to carry current between an exterior connection point and an internal connection point.

The conductor provides an external connection terminal on the motor housing to connect drive current cables. The conductor acts as a current bus through the insertion aperture into the motor housing. The interior end of the conductor acts as an interior connection terminal for an AC phase coil.

It is an object of the invention to provide an easily accessible apparatus to conduct drive current from an external AC power supply to the individual AC phase coils that constitute the AC motor's stator. During motor assembly, the insulating plug is inserted through an insertion aperture in the motor housing. The invention thereby, implements a close-profile robust exterior connection point. Accordingly, the invention provides an easily accessible solution to the problems discussed above. The accessibility of the connections significantly reduces the steps necessary to produce a robust operational motor.

It is another object of the invention to reduce the complexity of an AC motor manufacturing process and provide design flexibility. Specifically, the invention facilitates a significant degree of flexibility with regard to the placement of the external terminals around the motor housing. Depending on the specified operational requirements, the insulating plug aperture may be defined within the motor housing anywhere that is convenient for the AC motor design. For example, if a specific operating environment had been previously designed for a DC motor terminal configuration, the present invention allows the AC motor exterior terminal connections to replicate the DC configuration. Previously, it was necessary to re-design the operating environment to suit the AC motor's centrally located external terminal connections. Moreover, the housing apertures may be changed during manufacturing the motor housing to any location by adjusting the stamp template used to form the aperture in the housing.

The flexibility of terminal placement in the invention ensures compatibility with any existing DC terminal and cable locations in mature products. For example, if desired, a stamping program typically used to create the motor housing could be easily modified to replicate the pattern shown in the DC Motor illustrated in FIG. 1A.

DETAILED DESCRIPTION

Figure 1:
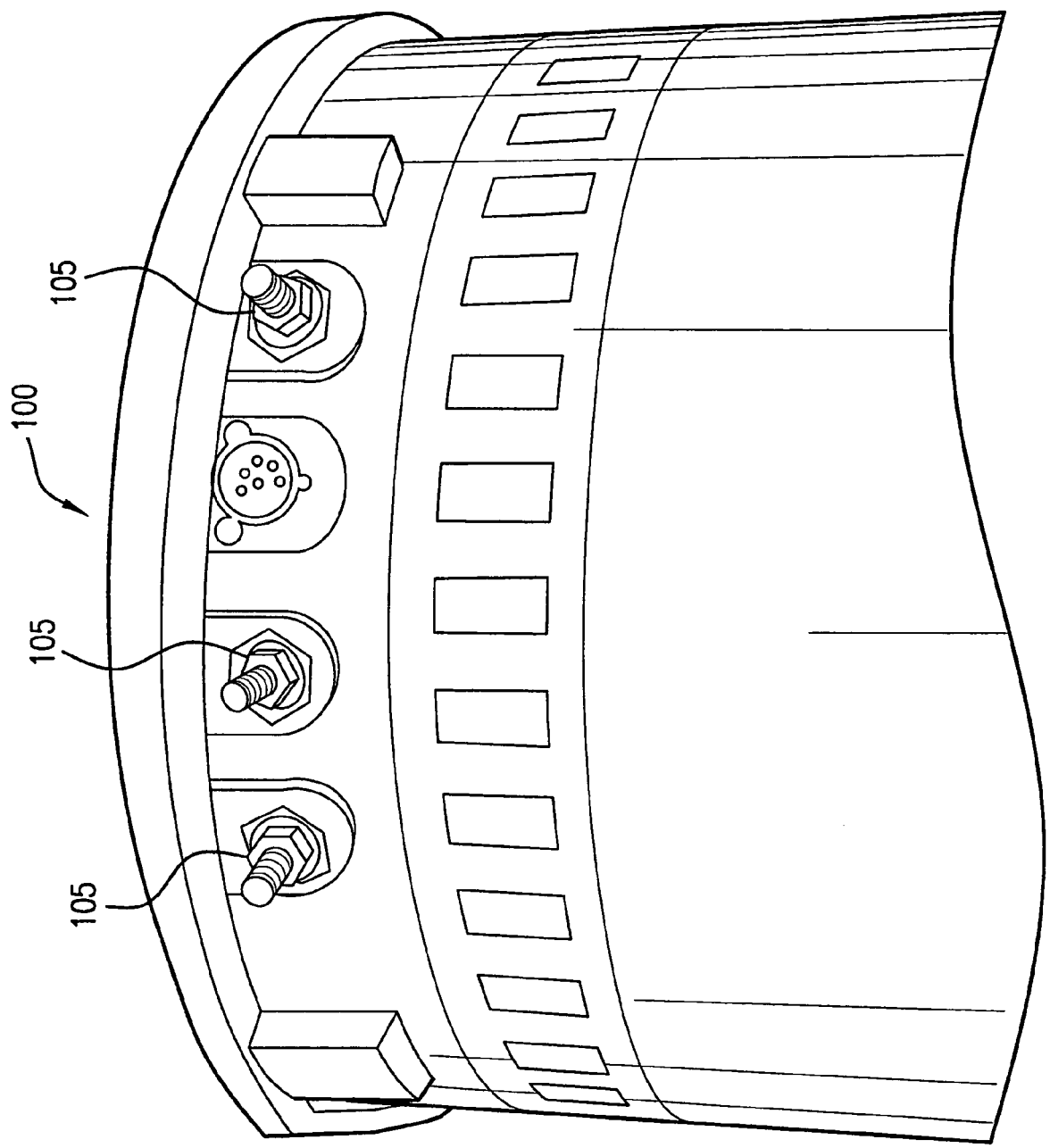
FIG. 1 shows a conventional DC motor connector terminal design.
Figure 2A:
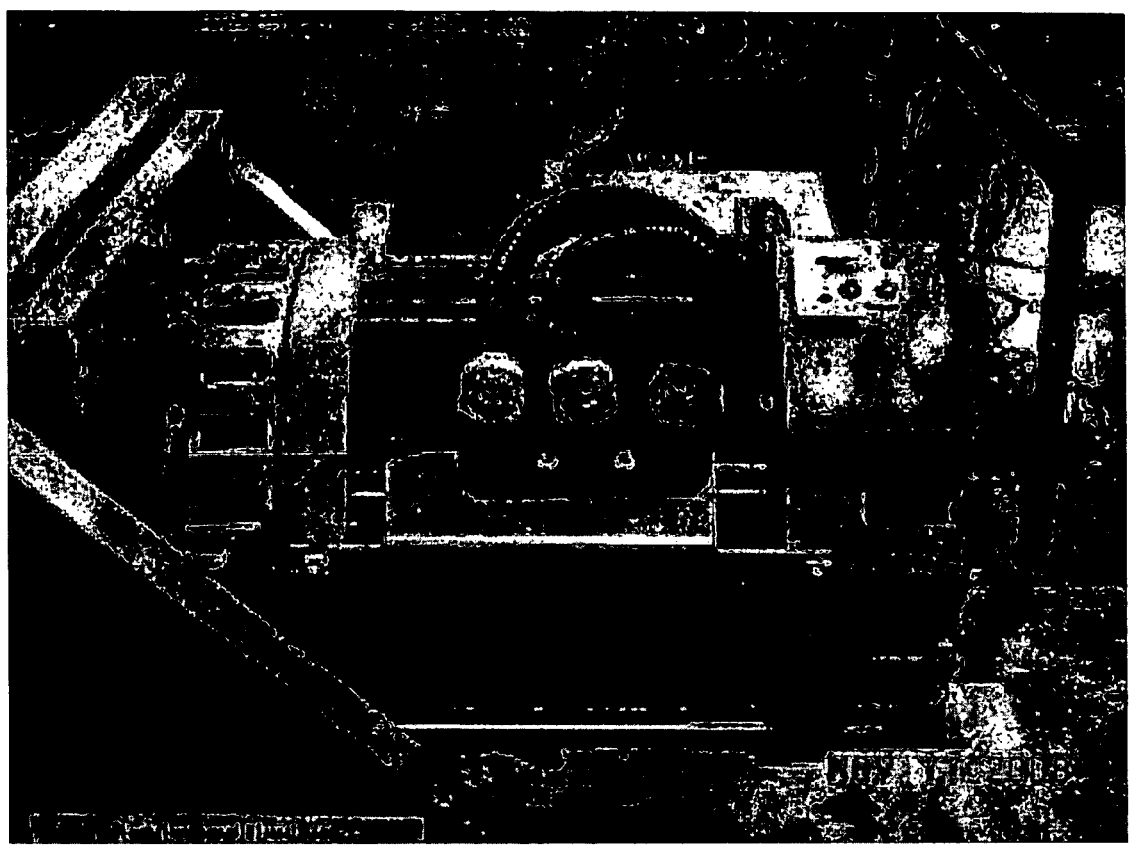
FIG. 2A is a black and white photograph of a conventional AC motor connector terminal design.
Figure 2B:
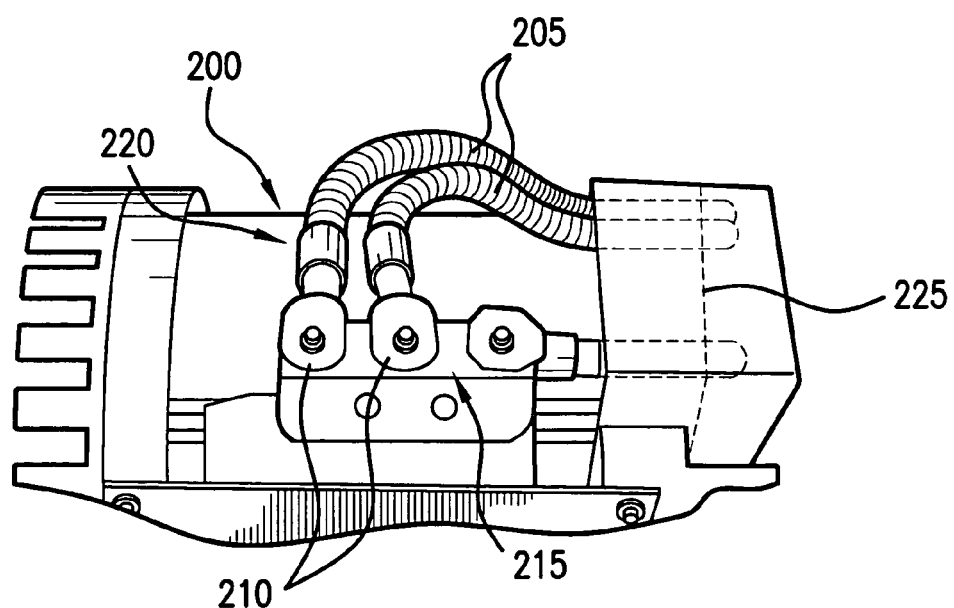
FIG. 2B shows the conventional AC motor design shown in FIG. 2A.

The invention provides a greater degree of flexibility for AC motor connection terminal designs, as well as addressing a variety of safety concerns related to conventional AC motor connection terminal designs. Previously, AC motor drive current was supplied to a conventional AC motor through power cables connected to an exterior AC connection terminal block (illustrated in FIGS. 2A and 2B). The connection terminal block facilitated an external connection with lead wires that run externally from the connection terminal block to an end of the AC motor. The lead wires entered the AC motor through an aperture in the center of an end bell of the motor and were connected directly to the respective AC phase coils.

Figure 3A:
FIG. 3A is a black and white photograph showing the side external view of an exemplary embodiment of the invention.
Figure 3B:
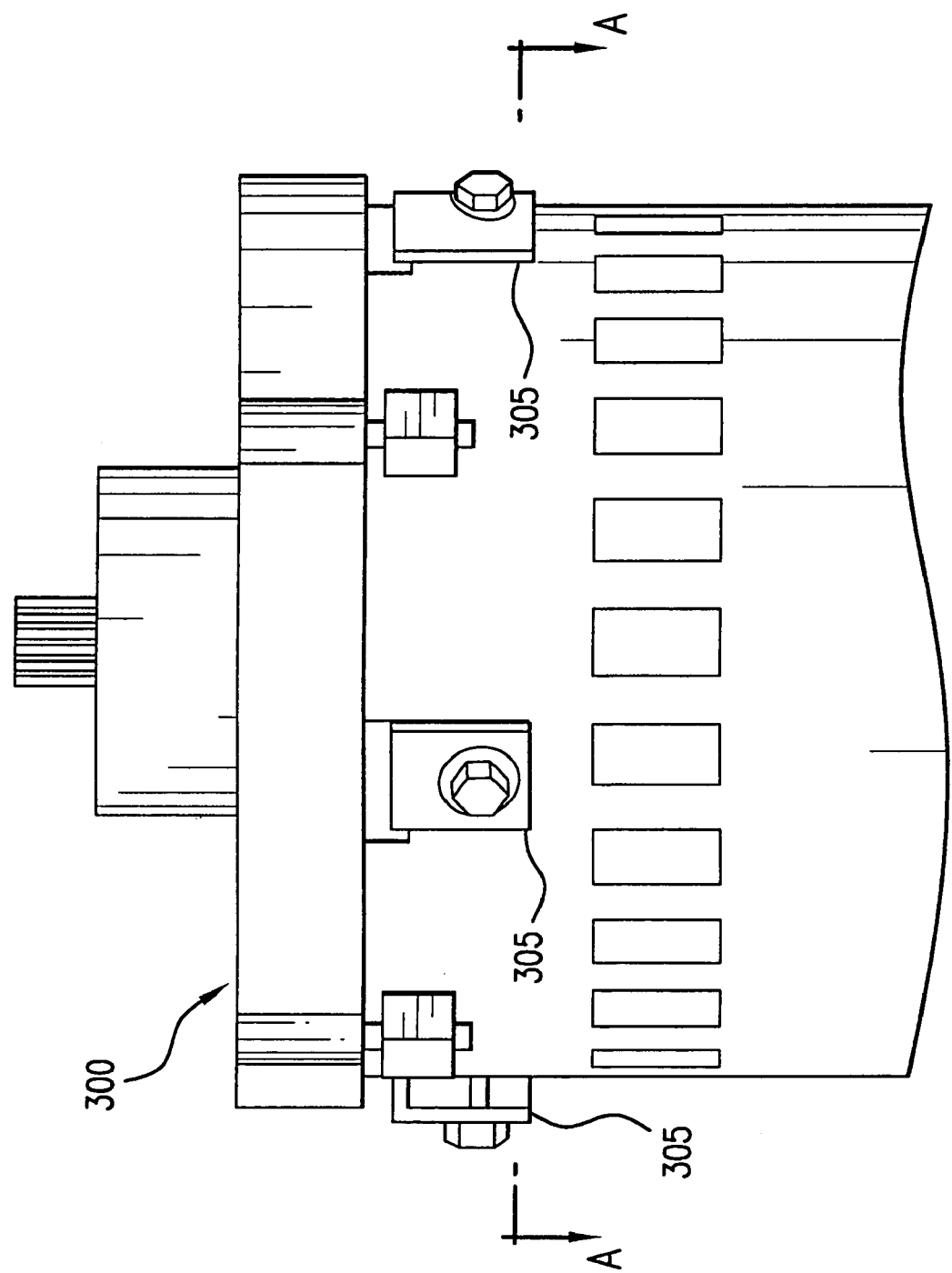
FIG. 3B is a diagram of the embodiment shown in FIG. 3A.

In contrast to the conventional AC motor, the invention as illustrated in FIGS. 3A and 3B, provides a simple, low profile, robust means of terminating AC phase coil windings. The lead wire connections are made internal to the motor housing.

Figure 3C:
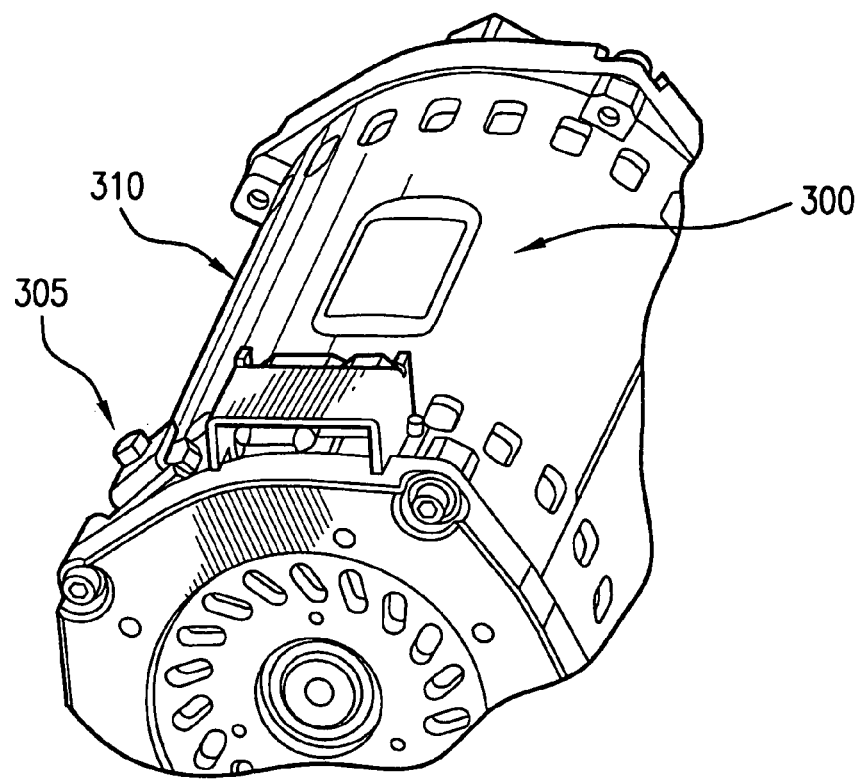
FIG. 3C is an exterior perspective view of the embodiment shown in FIG. 3A.
Figure 3D:
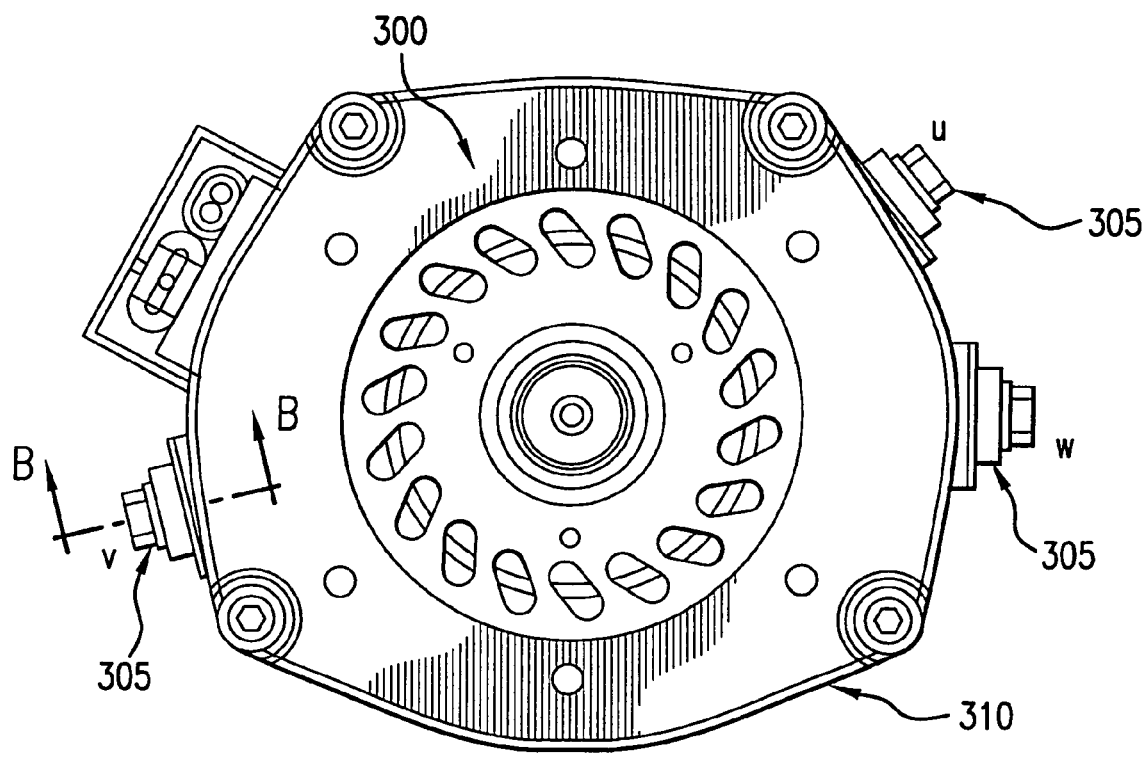
FIG. 3D is an exterior end view of the embodiment shown in FIG. 3A.

FIG. 3A is a black and white photograph of a side external view of an exemplary embodiment of the invention, specifically a TSW AC connection terminal design. FIG. 3B is a diagram of the motor shown in FIG. 3A and illustrates the exterior of the motor housing 310 and the three connection terminals 305 corresponding to the three phases of the AC motor 300. As illustrated, terminals 305 allow current from an AC drive to supply the AC motor 300. It is to be understood that there is a great deal of flexibility regarding the placement of the terminal connections in the motor housing to facilitate various motor designs and operating environments. FIGS. 3C and 3D illustrate different views of the embodiment of the invention shown in FIG. 3A. FIG. 3C shows the embodiment from FIG. 3A as a perspective view, whereas FIG. 3D shows the embodiment from FIG. 3A as an end view.

Figure 3E:
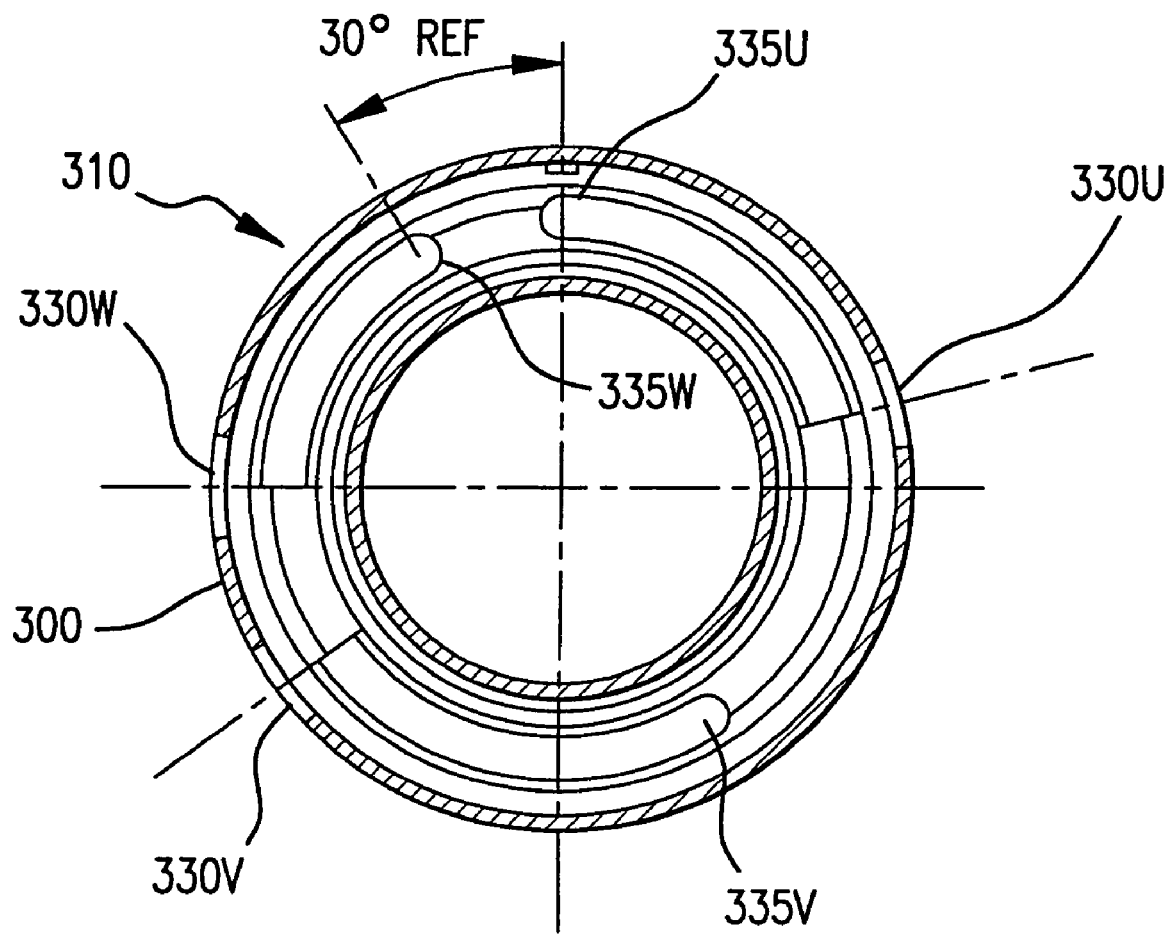
FIG. 3E is a cross-sectional end view showing the interior of the embodiment shown in FIG. 3A with the terminals removed.

FIG. 3E is a cross-sectional end view of the AC motor shown in FIG. 3B taken along line A-A. Specifically, FIG. 3E shows the end of each AC phase coil 335 for each of the respective phases (U, V, and W). As shown, the insertion apertures 330U, 330V and 330W are defined in the motor housing (310). Bundles of the copper coil comprising a given phase exit at points 335U, 335V, and 335W, respectively, and run to their respective apertures 330U, 330V, and 330W where they connect to a conductor bus.

An embodiment of the invention is directed to an insertion plug formed by a conductor disposed within an insulator block. The insertion plug is provided to connect an exterior motor drive source with an interior magnetic wire coil within an AC motor. The conductor is formed with two end extensions, an internal connection terminal and an external connection terminal, each disposed on a respective end of a conductor. The internal connection terminal is configured as a connection point for a lead from an AC motor coil, whereas the external connection terminal is configured as a connection point for an AC drive current cable. Various aspects of these elements are shown in greater detail in FIGS. 4A-4C.

Figure 4A:
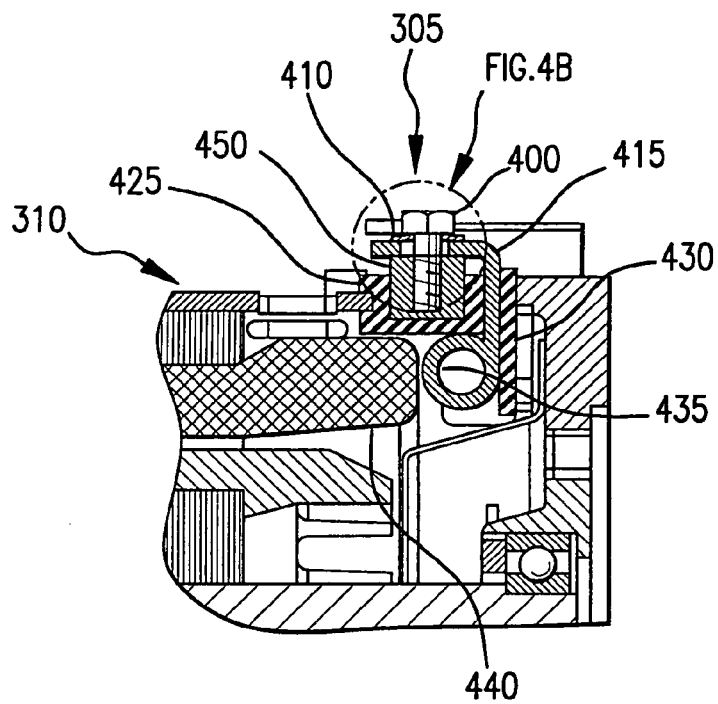
FIG. 4A is a cross-sectional view taken along a central axis B-B of the exemplary connection terminal illustrated in FIG. 3D.
Figure 4B:
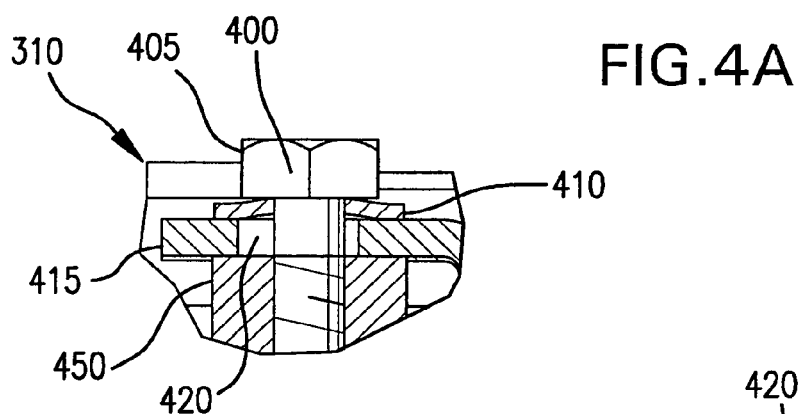
FIG. 4B is an enlarged view of the exemplary connection terminal fastening assembly illustrated in 4A.

FIGS. 4A and 4B include cross-sectional views taken along a central axis B-B and show elements that constitute an external connection terminal, exemplary insulator plug, conductor and interior connection terminal. External connection terminal 305 provides a connection point for a current drive cable (now shown) with a minimal external profile. Exterior connection terminal 305 (shown in greater detail in FIG. 4B) is connected with a conductor 415, e.g., a current bus, which conducts current from the exterior connection terminal 305 to an interior connection terminal 435.

In FIG. 4A, the conductor 415 and interior connection terminal 435 are illustrated as a single element, specifically flag terminal 415. The shape of the insertion plug is primarily defined by a pair of insulators 425 and 430. Insulators 425 and 430 electrically isolate the conductor from the motor housing 310 and provides a support structure for fastening receptacle 450 (described in greater detail below). Insulator 430 electrically isolates current bus 415 as the drive current flows to the interior connection terminal 435. The interior connection terminal 435 provides the connection point for the lead wires 330U, 330V and 330W, described in FIG. 3E of stator coils 440. The lead wires may be connected to the interior connection terminal by any conventional securing method (e.g. brazing, soldering, crimping, etc . . . ). In the exemplary embodiment of FIG. 4A the interior connection terminal 435 is configured so that the lead wire extending from stator coil 440 may be crimped to the interior connection terminal and thereby provide an electrical conducting path for AC current to drive the AC motor.

FIG. 4B shows the elements of the exterior connector terminal 305 in greater detail. Specifically, in an exemplary embodiment, a current drive cable (not shown) is secured to the insertion plug by fastener 400. The fastener 400 shown in FIG. 4B is a threaded bolt, assembled in coordination with fastening receptacle 450. The fastening receptacle is simply a threaded area seated in a support portion of the insulator 425, which receives the fastener 400. The fastening receptacle could simply be a threaded portion of the insulator itself. The threaded bolt 400 is inserted through apertures defined in the conductor 415 and support element 410 to engage threaded nut 450. Forming the aperture 420 in conductor 415 with a diameter greater than the bolt's diameter allows for flexibility in the location of the insertion plug and the fastener 400 within the housing.

The support element 410, which may be a conical spring washer, a bevel washer, or another type of supporting element, provides additional support to the connection between the drive current cable (not shown), the exterior connection terminal 305 and the conductor 415. Furthermore, support element 410 maintains pressure on the joint through a range of temperature and torque conditions (i.e., preventing rotation of the assembly). Also, it is to be understood that a wide variety of fasteners could be used, depending on design specifications. In the embodiment illustrated in FIGS. 4A and 4B, the fastener 400 is an M8×20 mm long steel Hex Head Bolt.

Figure 4C:
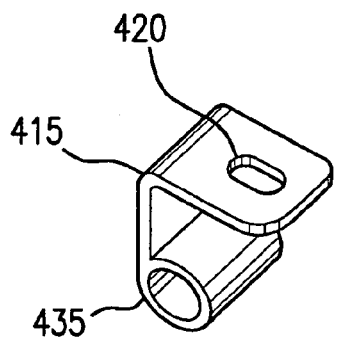
FIG. 4C is a perspective view of an exemplary embodiment of the conductor for the insertion plug.

As shown in FIG. 4C, the conductor, i.e., current bus, 415 is formed as a flag terminal that includes an aperture 420 for securing the fastener 400 and the power cable (not shown) at the exterior connection terminal 305. The use of the flag terminal incorporating substantially a right angle bend, provides a connection that is quite compact and robust both radially and axially. Conductor 415 also includes a cylindrical extension providing a stable connection point for the lead wire extending from stator 440 (shown in FIG. 4A) at the interior connection terminal 435. It is to be understood that the current bus 415 may be modified in accordance with different AC motor designs and operating environments. For example, the current bus may be adapted to accommodate a wide range of phase coil winding length variations and varying radial end turn exit locations. At it's simplest, the conductor is simply any conducting material passing through the insulator.

The invention incorporates a ring of conductive material as part of the terminal conductor, the interior connection terminal 435, which allows the process to require just one step: to place the bundle of magnet wire with the insulation within the interior connection terminal 435 and then use crimping and electric resistance fusing to make the connection. In this invention the interior connection terminal 435 is formed as an open circle and the final gap is closed by a brazing process.

Typically, the crimped and resistance fused electrical connections between bundles of magnet wire and the internal connection terminal are made with a roughly circular electrode which serves as both the crimping tool and the electrode. The circular electrode limits the amount of surface area contact to the connection and thereby limits the area that is crimped and the heat conducted into the joint to fuse the connection. As the number of wires in the lead bundle increases, the quality of the joint degrades.

In this invention, an elongated electrode is used where the length of the long axis of the electrode approximately equals the width of the internal connection terminal. This serves to increase the surface area contact to the connection and increases the area that is crimped and the heat conducted into the joint to fuse the connection. The additional heat at the joint provides for better vaporization of the wire insulation layer and thereby a better electrical connection. The brazed closing of the final gap in the interior connection, a terminal is required to ensure that the wires in the lead bundle remain in intimate contact with each other and therefore maintain a low resistance joint.

Figure 5:
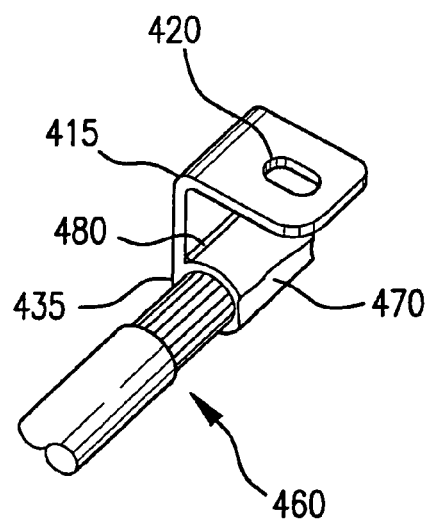
FIG. 5 illustrates crimping and brazing magnetic AC lead wires to a terminal conductor.

As shown in FIG. 5, the lead wire bundle 460, has been inserted into the conductor 415, and the interior connection terminal has been formed or crimped 470, as well as electrical resistance fused to the lead wire bundle. The brazed joint 480 is also shown in FIG. 5, which fills the remaining gap in the formed interior connection terminal.

It is to be understood that the above description is only representative of illustrative embodiments. For the convenience of the reader, the above descriptions have focused on a representative sample of possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

We claim:

1. An AC motor comprising:
   a stator;
   a plurality of internal phase coils wherein an end of each of the coils exits the stator and comprises a lead wire;
   a rotor;
   a motor housing with a plurality of insertion apertures defined at different locations in the exterior surface of the motor housing; and
   a plurality of insertion plugs for respective insertion apertures, each insertion plug including:
      a conductor configured with an external connection terminal formed at one end and an internal connection terminal formed at another end;
      an insulator configured to electrically isolate the body of the conductor when the insertion plug is inserted in an AC motor housing; and
      a fastening receptacle for engaging a fastening member,
      the external connection terminal being formed with substantially a right angle bend with respect to the longitudinal axis of the conductor, having a contact surface for a power cable connection and including on the contact surface a hole aligned with the fastening receptacle to allow a fastening member to pass therethrough and engage the fastening receptacle,
      the internal connection terminal being formed of a substantially circular bend at an end of the conductor and configured to accept a motor coil wire bundle lead therein for a single motor phase, and
      the insertion plug being configured to enable the external connection terminal to be placed independently on an AC motor housing from other external connection terminals for other motor phases.

2. The AC motor in claim 1, further comprising:
   a washer for each insertion plug and being disposed between a portion of the conductor and a portion of the fastening receptacle.

3. The AC motor in claim 1, wherein the fastening member is a bolt and the fastener receptacle is a nut.

4. The AC motor from claim 1, wherein the location of each of the insertion apertures in the motor housing is determined and stamped in a flat sheet of metal that is subsequently formed into the motor housing.

5. The AC motor as in claim 1, wherein the plurality of insertion plugs comprises three insertion plugs to provide connection three phase coils, respectively, to operatively control voltage to the three phase coils in a three-phase AC motor.

6. An AC motor insertion plug, comprising:
a conductor configured with an external connection terminal formed at one end and an internal connection terminal formed at another end;
an insulator configured to electrically isolate the body of the conductor when the insertion plug is inserted in an AC motor housing; and
a fastening receptacle for engaging a fastening member,
the external connection terminal being formed with substantially a right angle bend with respect to the longitudinal axis of the conductor, having a contact surface for a power cable connection and including on the contact surface a hole aligned with the fastening receptacle to allow a fastening member to pass therethrough and engage the fastening receptacle,
the internal connection terminal being formed of a substantially circular bend at an end of the conductor and configured to accept a motor coil wire bundle lead therein for a single motor phase, and
the insertion plug being configured to enable the external connection terminal to be placed independently on an AC motor housing from other external connection terminals for other motor phases.

7. The AC motor insertion plug in claim 6, wherein the conductor is formed from a flat strip of conductive material.

8. The AC motor insertion plug in claim 6, wherein the motor coil wire lead bundle is connected to the internal connection terminal using an electrode of approximate width equal to the conductor width of the internal connection terminal.

9. The AC motor insertion plug in claim 6, wherein the final gap of the formed internal connection terminal is closed with a brazed joint.

10. The AC motor insertion plug in claim 6, wherein the motor coil wire lead is secured to the interior connection terminal by one of brazing, welding or crimping the wire lead to the interior connection terminal.

11. A three-phase AC motor, comprising the AC motor insertion plug from claim 6, wherein the insertion plug acts in coordination with two additional insertion plugs to conduct voltage to the motor coils in the three phase AC motor.

12. An AC motor comprising:
a motor housing means for defining the exterior of the AC motor and a plurality of connection aperture; and
a plurality of insertion plugs configured to engage respective connection apertures, each of the insertion plugs associated with a different motor phase and comprising:
    a conductor configured with an external connection terminal formed at one end and an internal connection terminal formed at another end;
    an insulator configured to electrically isolate the body of the conductor when the insertion plug is inserted in an AC motor housing; and
    a fastening receptacle for engaging a fastening member,
    the external connection terminal being formed with substantially a right angle bend with respect to the longitudinal axis of the conductor, having a contact surface for a power cable connection and including on the contact surface a hole aligned with the fastening receptacle to allow a fastening member to pass therethrough and engage the fastening receptacle,
    the internal connection terminal being formed of a substantially circular bend at an end of the conductor and configured to accept a motor coil wire bundle lead therein for a single motor phase, and
    the insertion plug being configured to enable the external connection terminal to be placed independently on an AC motor housing from other external connection terminals for other motor phases.

13. An AC motor housing comprising:
a plurality of connection apertures defined in the motor housing
a plurality of insertion plugs for respective connection apertures, each insertion plug including:
    a conductor configured with an external connection terminal formed at one end and an internal connection terminal formed at another end;
    an insulator configured to electrically isolate the body of the conductor when the insertion plug is inserted in an AC motor housing; and
    a fastening receptacle for engaging a fastening member,
    the external connection terminal being formed with substantially a right angle bend with respect to the longitudinal axis of the conductor, having a contact surface for a power cable connection and including on the contact surface a hole aligned with the fastening receptacle to allow a fastening member to pass therethrough and engage the fastening receptacle,
    the internal connection terminal being formed of a substantially circular bend at an end of the conductor and configured to accept a motor coil wire bundle lead therein for a single motor phase, and
    the insertion plug being configured to enable the external connection terminal to be placed independently on an AC motor housing from other external connection terminals for other motor phases.

14. The AC motor in claim 1, wherein the circular bend of an internal connection terminal of each insertion plug comprises a tubular portion having a hole therethrough which extends across a width of the conductor to receive a motor coil wire bundle lead therein.

15. The AC motor in claim 1, wherein the motor coil wire lead is secured to the interior connection terminal by one of brazing, welding or crimping the wire lead to the interior connection terminal.

16. The AC motor in claim 6, wherein the circular bend of the internal connection terminal comprises a tubular portion having a hole therethrough which extends across a width of the conductor to receive a motor coil wire bundle lead therein.

17. The AC motor in claim 12, wherein the circular bend of an internal connection terminal of each insertion plug comprises a tubular portion having a hole therethrough which extends across a width of the conductor to receive a motor coil wire bundle lead therein.

18. The AC motor in claim 12, wherein the motor coil wire lead is secured to the interior connection terminal by one of brazing, welding or crimping the wire lead to the interior connection terminal.

19. The AC motor housing claim 13, wherein the circular bend of an internal connection terminal of each insertion plug comprises a tubular portion having a hole therethrough which extends across a width of the conductor to receive a motor coil wire bundle therein.

20. The AC motor housing in claim 13, wherein the motor coil wire lead is secured to the interior connection terminal by one of brazing, welding or crimping the wire lead to the interior connection terminal.

* * * * *